US012265818B2

(12) United States Patent
Oros

(10) Patent No.: US 12,265,818 B2
(45) Date of Patent: *Apr. 1, 2025

(54) DYNAMIC ARTIFICIAL INTELLIGENCE / MACHINE LEARNING MODEL UPDATE, OR RETRAIN AND UPDATE, IN DIGITAL PROCESSES AT RUNTIME

(71) Applicant: UiPath, Inc., New York, NY (US)

(72) Inventor: Andrei Robert Oros, Timisoara (RO)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,663

(22) Filed: Nov. 20, 2023

(65) Prior Publication Data

US 2024/0095017 A1    Mar. 21, 2024

Related U.S. Application Data

(63) Continuation of application No. 16/722,301, filed on Dec. 20, 2019, now Pat. No. 11,822,913.

(51) Int. Cl.
*G06F 8/65* (2018.01)
*G06F 8/71* (2018.01)
(Continued)

(52) U.S. Cl.
CPC ............... *G06F 8/65* (2013.01); *G06F 8/71* (2013.01); *G06F 18/214* (2023.01); *G06N 20/00* (2019.01)

(58) Field of Classification Search
None
See application file for complete search history.

(56) References Cited

U.S. PATENT DOCUMENTS 6,119,149 A    9/2000 Notani
6,458,081 B1   10/2002 Matsui et al.
(Continued)

FOREIGN PATENT DOCUMENTS

CN    103218217 A    7/2013
CN    109102145 A    12/2018
(Continued)

OTHER PUBLICATIONS

Aguirre, Santiago, and Alejandro Rodriguez. "Automation of a business process using robotic process automation (rpa): A case study." Workshop on Engineering Applications. Springer, Cham, 2017. (Year: 2017).

(Continued)

*Primary Examiner* — Daniel T Pellett
(74) *Attorney, Agent, or Firm* — LeonardPatel PC; Michael A. Leonard II; Sheetal S. Patel

(57) ABSTRACT

Dynamically updating, or retraining and updating, artificial intelligence (AI)/machine learning (ML) models in digital processes at runtime is disclosed. Production operation may not need to be stopped for AI/ML model update or retraining and update. The update steps and/or retraining steps for the AI/ML model may be included as part of the digital process. The AI/ML model update may be requested from internal logic (e.g., from the evaluation of a condition, by an expression that calls for the AI/ML model, etc.), external requests (e.g., from external triggers in a finite state machine (FSM), such as a file change, database data, a service call, etc.), or both. Automation of AI/ML model updates or retraining and updates may be provided, where the software reloads/reinitializes/re-instantiates with a retrained and/or updated AI/ML model after (and possibly immediately after) the AI/ML model becomes available.

20 Claims, 18 Drawing Sheets

(51) Int. Cl.
G06F 18/214 (2023.01)
G06N 20/00 (2019.01)

(56) References Cited

U.S. PATENT DOCUMENTS

| | | | |
|---|---|---|---|
| 8,645,276 | B2 | 2/2014 | Wong et al. |
| 9,690,644 | B2 | 6/2017 | Anderson et al. |
| 9,785,497 | B1 | 10/2017 | Cook et al. |
| 10,235,192 | B2 | 3/2019 | Hall et al. |
| 2005/0251527 | A1 | 11/2005 | Phillips et al. |
| 2007/0043565 | A1 | 2/2007 | Aggarwal et al. |
| 2013/0035973 | A1 | 2/2013 | Desai et al. |
| 2016/0070596 | A1 | 3/2016 | Anand et al. |
| 2016/0080422 | A1 | 3/2016 | Belgodere et al. |
| 2018/0032393 | A1 | 2/2018 | Chavda et al. |
| 2018/0089591 | A1 | 3/2018 | Zeiler et al. |
| 2018/0197123 | A1 | 7/2018 | Parimelazhagan et al. |
| 2018/0329399 | A1 | 11/2018 | Neelakandan et al. |
| 2018/0365617 | A1 | 12/2018 | Ghosh et al. |
| 2018/0370029 | A1 | 12/2018 | Hall et al. |
| 2019/0057203 | A1 | 2/2019 | Buddhiraju et al. |
| 2019/0102676 | A1 | 4/2019 | Nazari et al. |
| 2019/0126463 | A1 | 5/2019 | Purushothaman |
| 2019/0129759 | A1 | 5/2019 | Stevens et al. |
| 2019/0130260 | A1 | 5/2019 | Han et al. |
| 2019/0130310 | A1 | 5/2019 | Rao et al. |
| 2019/0155225 | A1 | 5/2019 | Kothandaraman et al. |
| 2019/0180746 | A1 | 6/2019 | Diwan et al. |
| 2019/0244149 | A1 | 8/2019 | Krishnaswamy |
| 2019/0318198 | A1 | 10/2019 | Griffin et al. |
| 2019/0332508 | A1 | 10/2019 | Goyal et al. |
| 2019/0340686 | A1 | 11/2019 | Cella |
| 2020/0074595 | A1 | 3/2020 | Wald et al. |
| 2021/0072734 | A1 | 3/2021 | Hirota |

FOREIGN PATENT DOCUMENTS

| | | |
|---|---|---|
| CN | 109117215 A | 1/2019 |
| CN | 109446259 A | 3/2019 |
| CN | 109600688 A | 4/2019 |
| JP | H05279980 A | 10/1993 |
| JP | 2001137237 A | 5/2001 |
| JP | 2005309712 A | 11/2005 |
| JP | 2019159556 A | 9/2019 |
| JP | 2019206041 A | 12/2019 |
| KR | 20170032133 A | 3/2017 |
| KR | 20170101455 A | 9/2017 |
| KR | 1020190095193 A | 8/2019 |
| KR | 1020190106925 A | 9/2019 |
| WO | 2018111270 A1 | 6/2018 |
| WO | 2019215994 A1 | 11/2019 |
| WO | 2019216938 A1 | 11/2019 |

OTHER PUBLICATIONS

Bellman, et al., "Intelligent Process Automation: Building the Bridge Between Robotic Process Automation and Artificial Intelligence", (2019).
Berruti, et al. "Intelligent Process Automation: The Engine at the Core of the Next-Generation Operating Model", Digital McKinsey, (Mar. 2017).
Chalmers, Eric, "Machine Learning with Certainty: A Requirement for Intelligent Process Automation." 2018 17th IEEE International Conference on Machine Learning and Applications (ICMLA). IEEE, 2018.
Daniel T Pellett, "Examiner's Answer", issued Dec. 20, 2021, U.S. Appl. No. 16/722,301.
Daniel T Pellett, "Final Office Action", issued Mar. 3, 2021, U.S. Appl. No. 16/722,301.
Daniel T Pellett, "Non-Final Office Action", issued May 26, 2021, U.S. Appl. No. 16/722,301.
Daniel T Pellett, "Non-Final Office Action", issued May 27, 2020, U.S. Appl. No. 16/722,301.
Daniel T Pellett, "Non-Final Office Action", issued Nov. 25, 2020, U.S. Appl. No. 16/722,301.
Daniel T Pellett, "Notice of Allowance", issued Oct. 3, 2023, U.S. Appl. No. 16/722,301.
Devshree Golecha, "Robotic Process Automation," Foreign Digest on Quality, Issue 2, available at http://www.cnki.net (Feb. 2019).
European Search Report issued in EP Application No. 20189062 on Jan. 13, 2021.
First Office Action issued in CN Application No. 202010897123.5 on Jun. 14, 2023.
First Office Action Search Report issued in CN Application No. 202010897123.5 on Jun. 14, 2023.
Geyer-Klingeberg, Jerome, et al. "Process Mining and Robotic Process Automation: A Perfect Match." 8PM (Dissertation/Demos/Industry). 2018. (Year: 2018).
Kopec, et al., "Hybrid Approach to Automation, RPA and Machine Learning: A Method for the Human-Centered Design of Software Robots." arXiv preprint arXiv: 1811.02213 (2018).
Lacity, Mary C. et al., "A New Approach to Automating Services" MIT Sloan Management Review (2017).
Le Clair, Craig, A. Cullen, and M. King. "The Forrester Wave™ : Robotic Process Automation, 01 2017." Forrester Research (2017). (Year: 2017).
Mohanty, et al., "How to Compete in the Age of Artificial Intelligence: Implementing a Collaborative Human-Machine Strategy for Your Business" (2018).
Notice of Allowance issued in Japanese Application No. 2020-125400 on May 31, 2022.
Notice of Allowance issued in Korean Application No. 10-2020-0103986 on Jul. 25, 2022.
Notification of Reasons for Refusal issued in Japanese Application No. 2020-125400 on Nov. 16, 2021.
Office Action issued in Korean Application No. 10-2020-0103986 on Dec. 21, 2021.
Ruchi Isaac et al., "Delineated Analysis of Robotic Process Automation Tools," First International Conference on Information Technology, Communications and Computing (ICITCC 2017), Bhopal, M.P., India (Dec. 24, 2017).
Tanetaka Ogasawara, supervised by UiPath Co., Ltd., "Improve business with RPA tools! Introduction to UiPath Basics", 1st Edition, Shuwa System Co., Ltd., 12th to 34th, 56th to 69th, 130th to 137th, ISBN: 978-4-7980-5712-5 (Apr. 5, 2019).
Tripathi, Alok Mani. Learning Robotic Process Automation: Create Software robots and automate business processes with the leading RPA tool-UiPath. Packt Publishing Ltd, 2018. (Year: 2018).
UiPath RPA Cooperation Development Kit for AI Inside Handwritten AI-OCR Solution "DX Suite" Article available at https://dx-suite.com/news/2019/01/16/aiinside-uipath-release (Jan. 16, 2019).
Van der Aalst, Wil MP, Martin Bichler, and Armin Heinzl. "Robotic process automation." (2018): 269-272. (Year: 2018).
Ajay Kattepur, "Workflow composition and analysis in Industry 4.0 warehouse automation," IET Collab. Intell. Manuf., vol. 1 Iss. 3, pp. 78-89 (Sep. 2019).
Chenglai Wu, "Study on the Event Stream Processing in the Real-Time and Dynamic Access Control," Master's Theses for Anhui University of Technology (Dec. 20, 2015).
Notice of Intent to Grant a Patent issued in Chinese Application No. 202010897123.5 on Nov. 22, 2023.
Search Report for Notice of Grant issued in Chinese Application No. 202010897123.5 on Nov. 22, 2023.

DYNAMIC ARTIFICIAL INTELLIGENCE / MACHINE LEARNING MODEL UPDATE, OR RETRAIN AND UPDATE, IN DIGITAL PROCESSES AT RUNTIME

CROSS-REFERENCE TO RELATED APPLICATION

This application is a continuation of, and claims priority to, U.S. patent application Ser. No. 16/722,301 filed on Dec. 20, 2019, and issued as U.S. Pat. No. 11,822,913 on Nov. 21, 2023. The subject matter of this earlier filed application is incorporated by reference in its entirety.

FIELD

The present invention generally relates to artificial intelligence (AI), and more specifically, to dynamically updating, or retraining and updating, AI/machine learning (ML) models in digital processes at runtime.

BACKGROUND

AI/ML models are currently deployed as part of digital processes executed on various types of computing systems. These AI/ML models may perform classifications, provide predictions, perform data analysis, etc. AI/ML models may need to be updated, or retrained and updated, due to a domain or business rule change, to provide better outputs (e.g., predictions, classifications, etc.), or for other reasons.

Currently, the AI/ML model update process requires system downtime and scheduled maintenance time. This can impact employee productivity, revenue generation, availability of services, etc. Accordingly, an improved approach to updating AI/ML models, and to retraining and updating AI/ML models, may be beneficial.

SUMMARY

Certain embodiments of the present invention may provide solutions to the problems and needs in the art that have not yet been fully identified, appreciated, or solved by current AI technologies. For example, some embodiments of the present invention pertain to dynamically updating, or retraining and updating, AI/ML models in digital processes at runtime.

In an embodiment, a computer-implemented method includes listening for an update request for an AI/ML model, by a digital process executing on a computing system. When the update request is received to update the AI/ML model, the computer-implemented method includes reinitializing or re-instantiating the digital process to call an updated version of the AI/ML model and listening for another update request, by the digital process executing on the computing system. The updating of the AI/ML model occurs during runtime of the digital process.

In another embodiment, a computer program including a digital process is embodied on a non-transitory computer-readable medium. The program is configured to cause at least one processor to listen for a retraining request or an update request for an AI/ML model. When the retraining request is received to retrain the AI/ML model, the program is configured to cause the at least one processor to initiate retraining of the AI/ML model. When the update request is received to update the AI/ML model, the program is configured to cause the at least one processor to reinitialize or re-instantiate the digital process to call an updated version of the AI/ML model and listen for another retraining request or update request. The retraining or updating of the AI/ML model occurs during runtime of the digital process.

In yet another embodiment, a computing system includes memory storing computer program instructions including a digital process and at least one processor configured to execute the computer program instructions. The instructions are configured to cause the at least one processor to listen for a retraining request for an AI/ML model. When the retraining request is received to retrain the AI/ML model, the instructions are configured to cause the at least one processor to initiate retraining of the AI/ML model. The retraining of the AI/ML model occurs during runtime of the digital process.

In still another embodiment, a computer-implemented method for dynamic update, or retraining and update, of an AI/ML model includes listening for an update request for the AI/ML model, by an RPA digital process executing on a computing system. When the update request is received to update the AI/ML model, the computer-implemented method includes reinitializing or re-instantiating the RPA digital process to call an updated version of the AI/ML model and listening for another update request, by the RPA digital process executing on the computing system. The updating of the AI/ML model occurs during runtime of the RPA digital process. The RPA digital process includes an RPA workflow and the AI/ML model is called by an activity of the RPA workflow.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7B illustrates screenshots of parameters of the initialization state of FIG. 7A, according to an embodiment of the present invention.

Unless otherwise indicated, similar reference characters denote corresponding features consistently throughout the attached drawings.

DETAILED DESCRIPTION OF THE EMBODIMENTS

Figure 1:
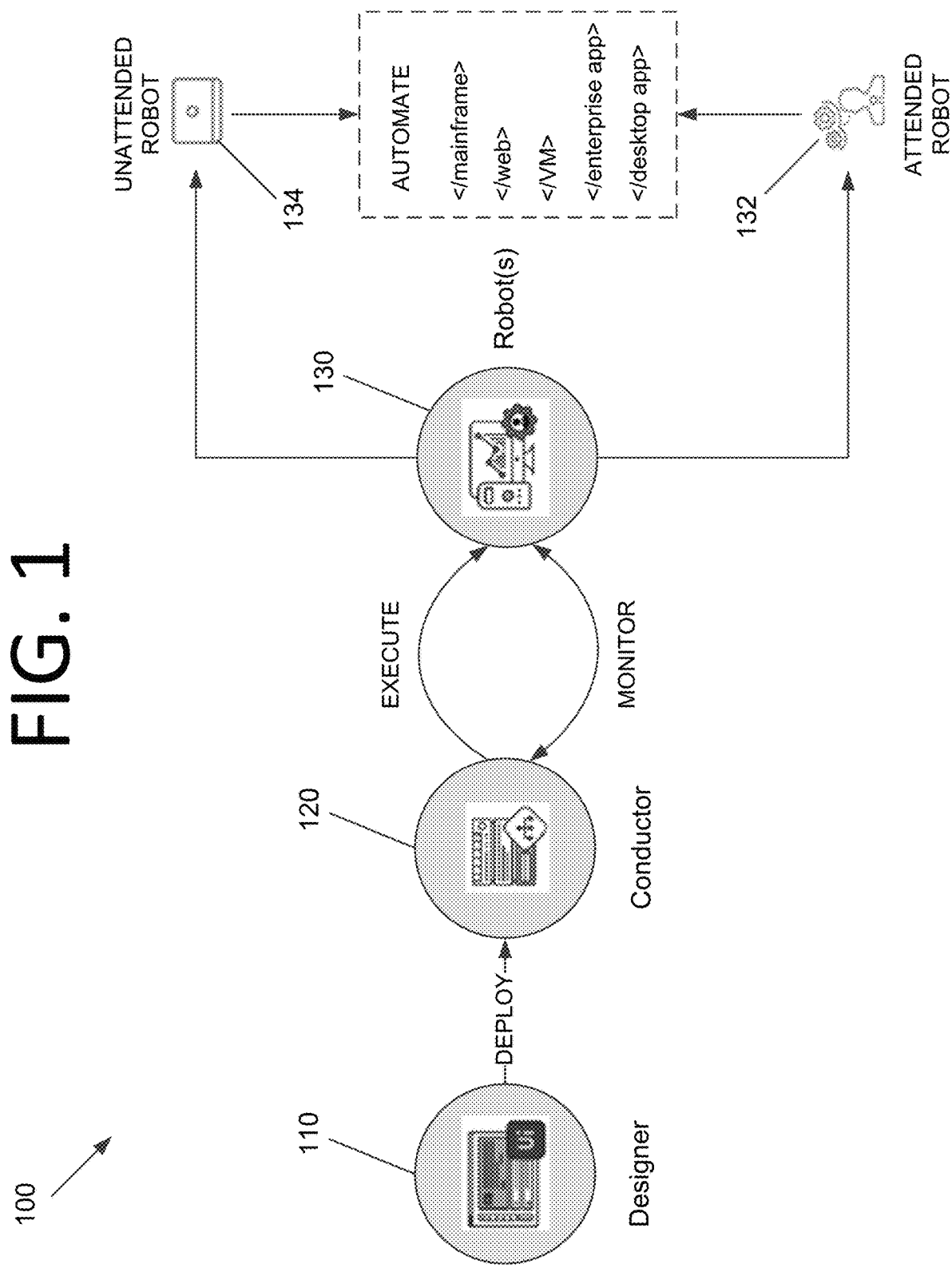
FIG. 1 is an architectural diagram illustrating a robotic process automation (RPA) system, according to an embodiment of the present invention.

Some embodiments pertain to dynamically updating, or retraining and updating, AI/ML models in digital processes at runtime (i.e., when the software is executing or while persisted). As such, production operation does not need to be stopped for AI/ML model update or retraining and update. The update steps and/or retraining steps for the AI/ML model may be included as part of the digital process in some embodiments. In some embodiments, the AI/ML model update may be requested from internal logic (e.g., from the evaluation of a condition, by an expression that calls for the AI/ML model, etc.), external requests (e.g., from external triggers in a finite state machine (FSM), such as a file change, database data, a service call, etc.), or both. As used herein, digital processes include software-implemented workflows of all types (e.g., robotic process automation (RPA), business process management (BPM) software flowcharts, sequential flows, FSMs, etc.), applications, solutions, system services, functions, methods, scripts, etc. Operational states of the digital process include, but are not limited to, design time (e.g., stopped, configuring, redesigning, etc.), runtime (e.g., executing, persisted, etc.), etc.

Applications typically imply something that is granular from the functionality perspective and serves a specific role. System solutions can be a part of a larger solution that serves a specific topic (e.g., user management functionality can have password reset, personal time off requests, medical requests, employee onboarding, etc.). Applications typically imply a front-end or user interface (UI), whereas system services usually run in the background. A collection of applications may be grouped as a solution, whereas a collection of services may be grouped as system services.

For maximum efficiency and return of investment (ROI), it may be desirable for the systems and solutions to run with as little downtime as possible. Currently, in digital processes, AI/ML model update, and/or retraining and update, requires maintenance downtime, which renders the process unavailable. The ability to dynamically update, or retrain and update, AI/ML models called by digital processes at runtime provides various advantages. For instance, software employing these capabilities may have zero or almost no downtime resulting from updating or retraining and updating AI/ML models. Automation of AI/ML model updates or retraining and updates may be provided, where the software reloads/reinitializes/re-instantiates with a retrained and/or updated AI/ML model after (and possibly immediately after) the AI/ML model becomes available.

As used herein, "reload" is the operation through which the AI/ML model data is taken from the AI/ML model data store (e.g., file, memory, etc.) by its containing layer (e.g., an activity in the case of RPA). "Reinitialization" refers to a state/phase in a generic process where the state of some/all components is reset to an initial/known/desired value. "Re-instantiation" refers to the creation of an object in object oriented programming where the object in this case is the AI/ML Model inside an application, process, function, etc. at runtime.

Some embodiments may automate the AI/ML model retraining/update process such that it does not need to be executed by a user. For instance, the AI/ML model may be automatically retrained when a predetermined amount of time has elapsed since the last training operation, a predetermined amount of data is received, a combination thereof, etc. When the performance of the retrained AI/ML model meets expectations (e.g., achieves a 90% accuracy), exceeds performance of the currently executing version, or both, the retrained AI/ML model may be automatically deployed (i.e., updated) without user interaction.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
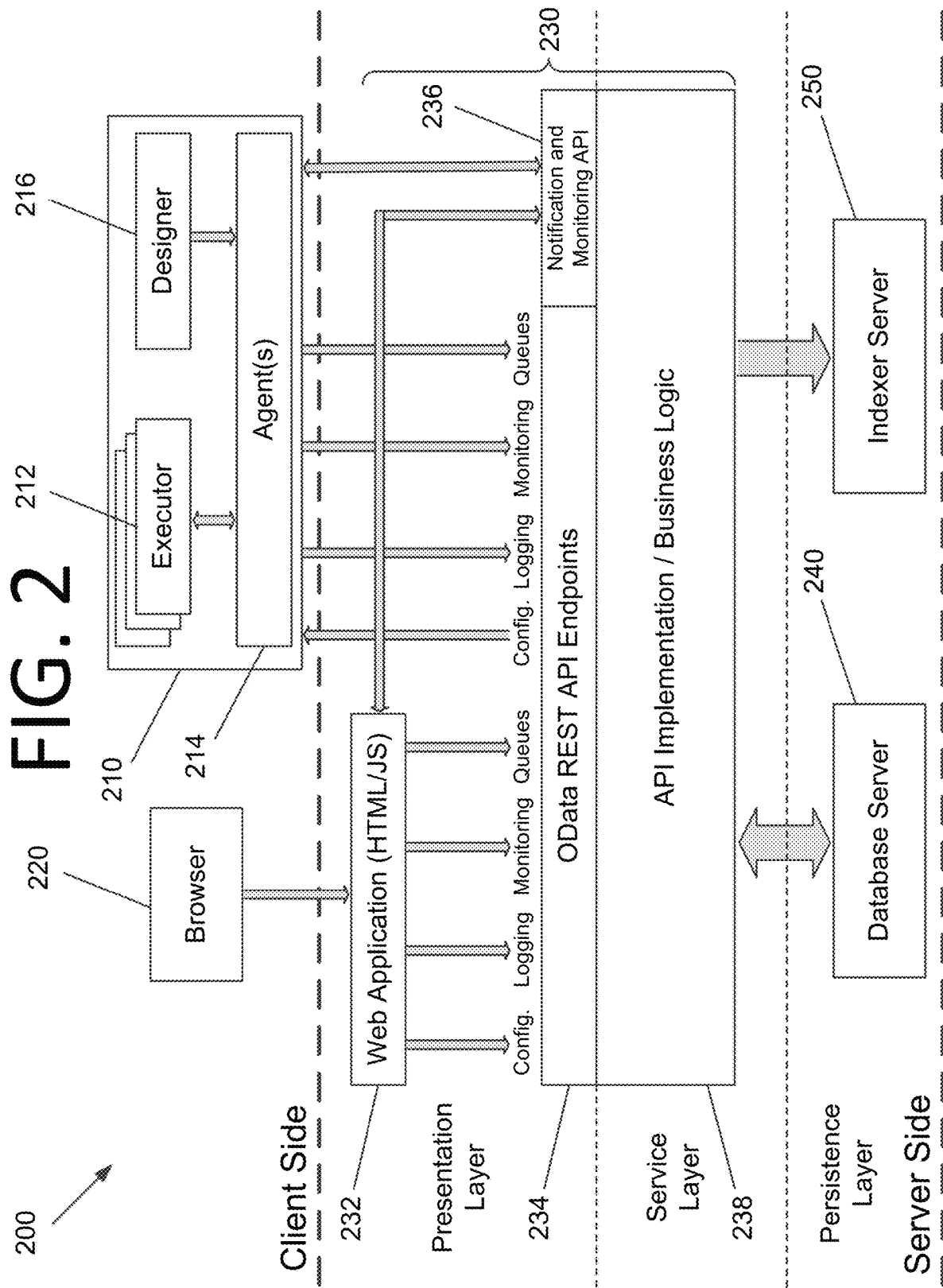
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
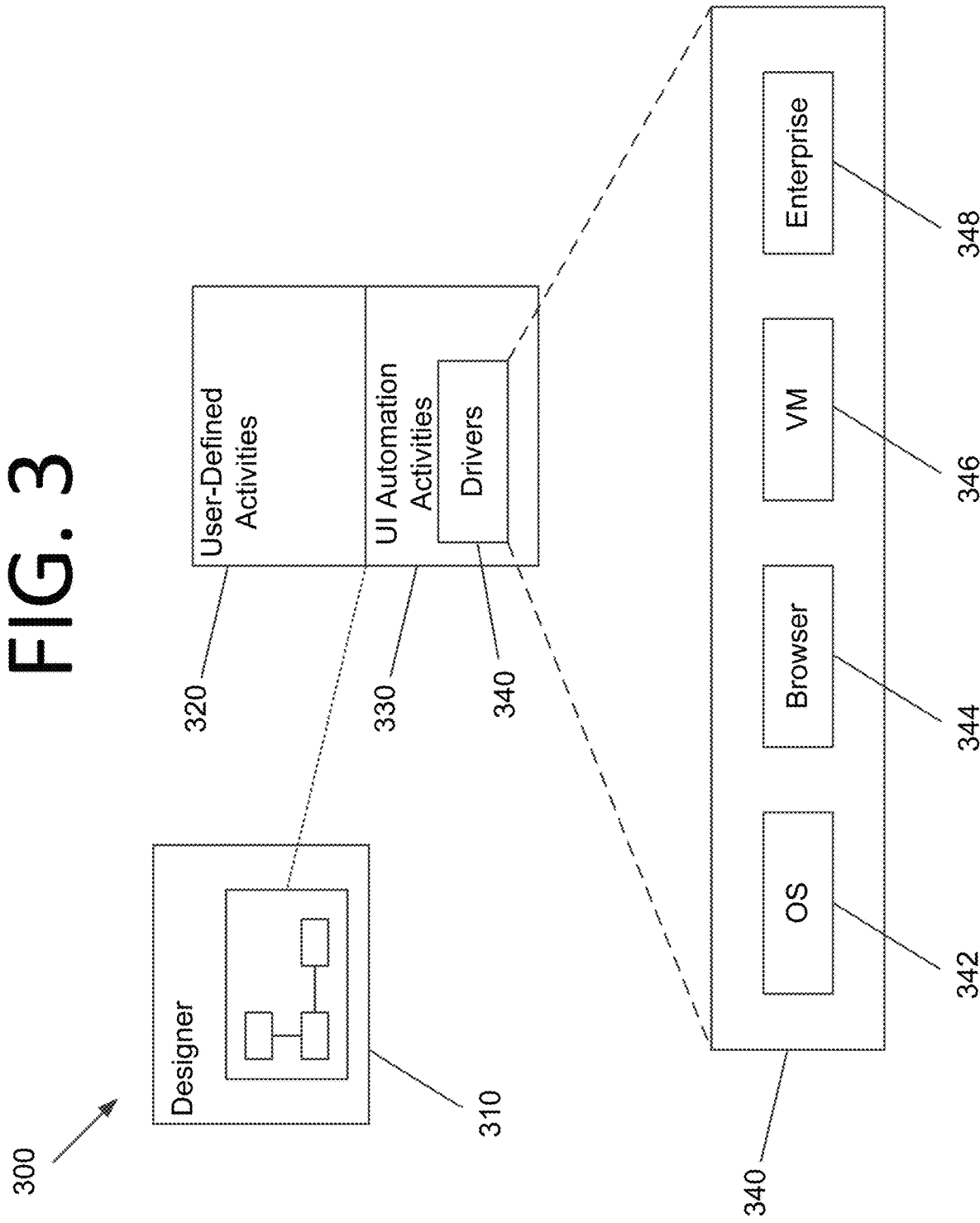
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
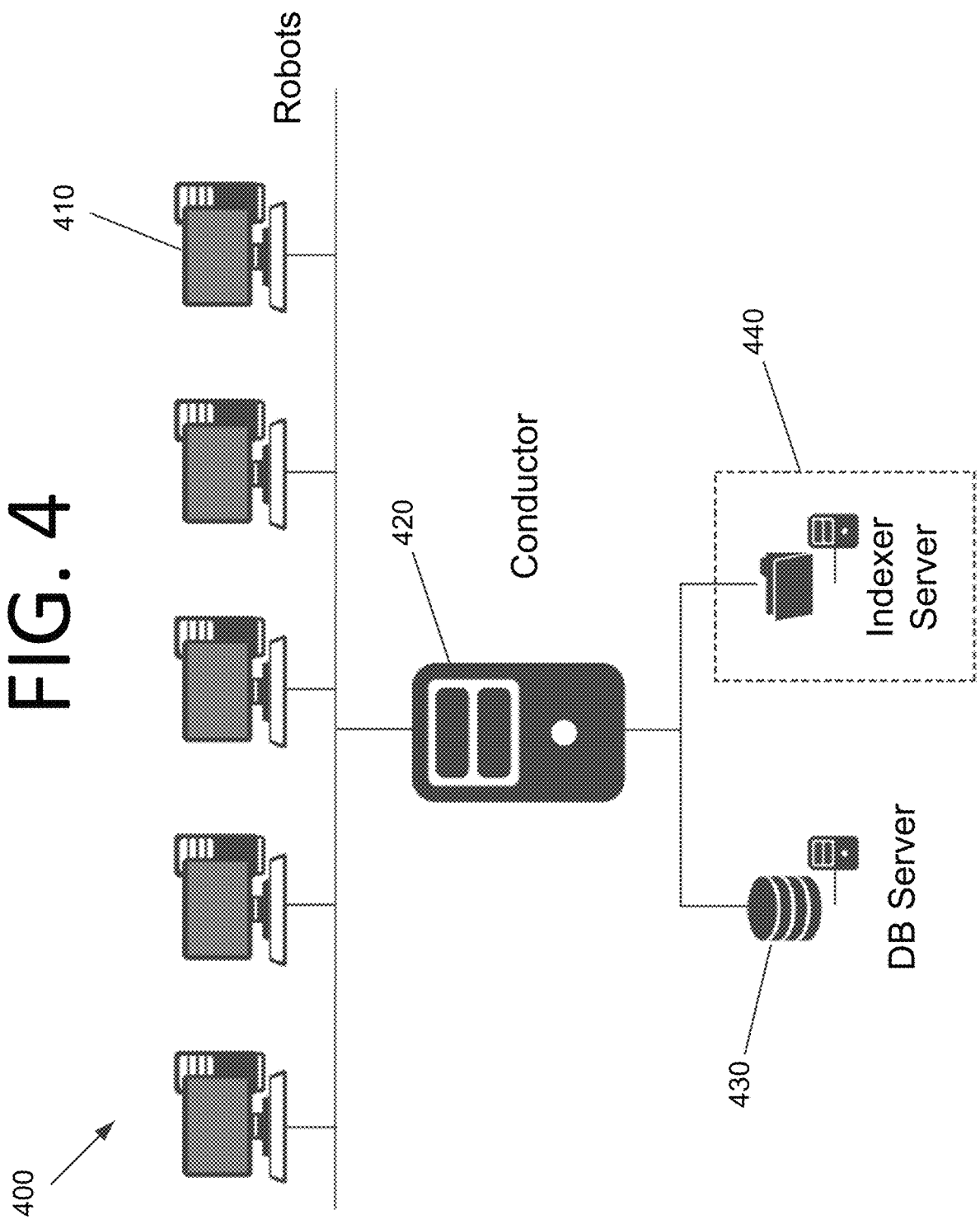
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
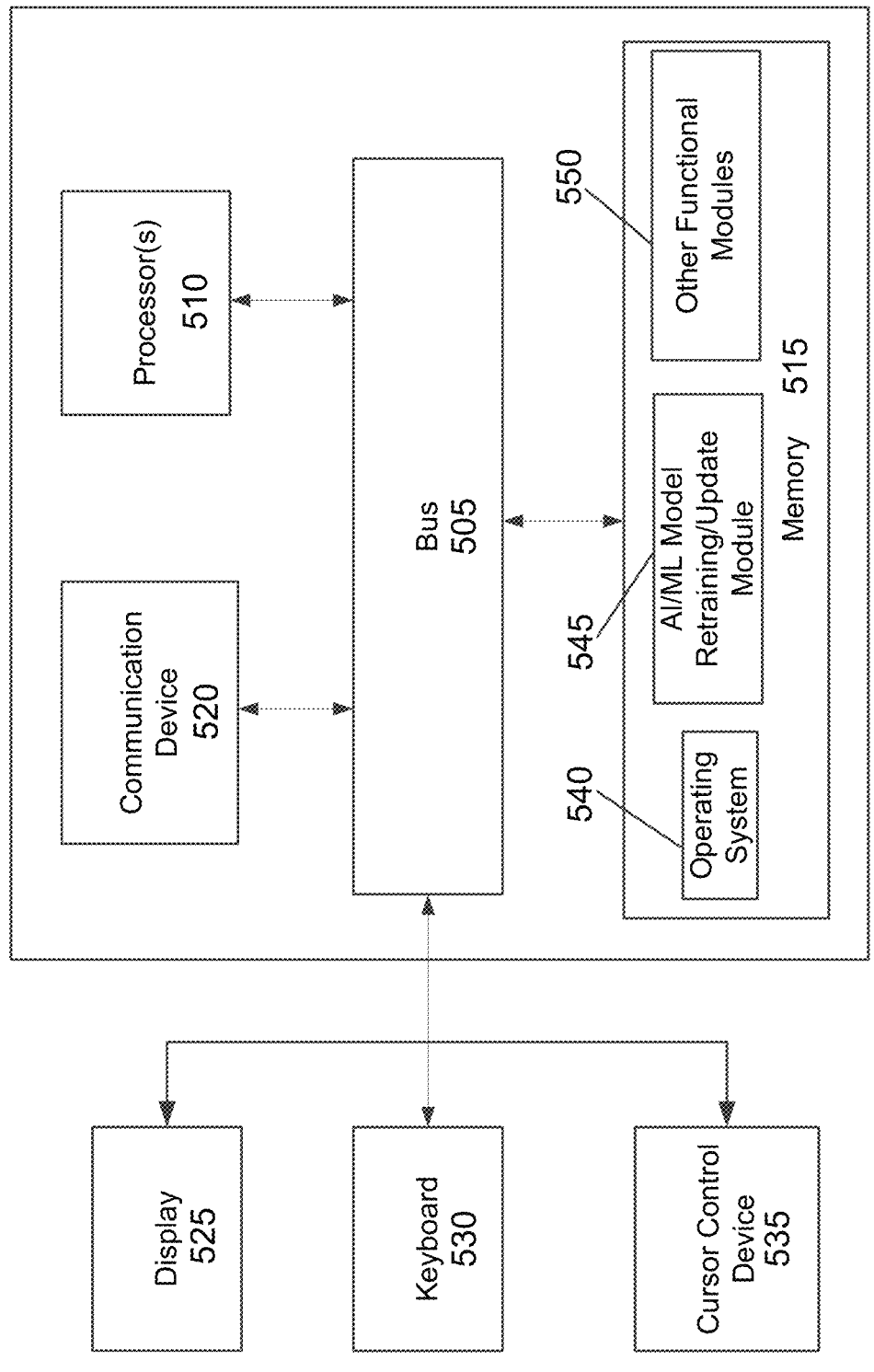
FIG. 5 is an architectural diagram illustrating a computing system configured to dynamically update, or retrain and update, an AI/ML model at runtime, according to an embodiment of the present invention.

FIG. 5 is an architectural diagram illustrating a computing system 500 configured to dynamically update, or retrain and update, an AI/ML model at runtime, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideB and (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model retraining/update module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the context of RPA, the AI/ML model may be available as part of an activity that may be integrated into an RPA workflow using drag-and-drop functionality, for example. The activity may include one or more input arguments of desired types and may return one or more outputs of desired types. The AI/ML model may be embedded directly in the activity or could be loaded/executed or called/executed from an external source. For instance, the AI/ML model could be loaded/executed or called/executed from a local or remote file in permanent memory, from a service, from a local or remote database, from a stream, from non-permanent memory (e.g., RAM, processor cache, etc.), etc. For instance, if the AI/ML model was trained with ML.NET, the AI/ML model may be loaded from an external .zip file at runtime and may then be initialized/instantiated.

In implementations where the AI/ML model is not stored on the local computing system, the AI/ML model may be stored on and provided or executed by an on-site server accessible by the computing system (which may itself be a server in some embodiments), a remote server at a different site (e.g., a server farm), a cloud storage solution, etc. The AI/ML model may be executed from a file, a database (e.g., via SQL), a service, a universal resource locator (URL), file transfer protocol (FTP), a stream, or via any other suitable mechanism without deviating from the scope of the invention. Indeed, any architectures/configurations where the AI/ML model is able to be loaded/executed or called/executed by the local computing system without deviating from the scope of the invention. This may also be the case with non-RPA embodiments.

RPA Implementation

Figure 6:
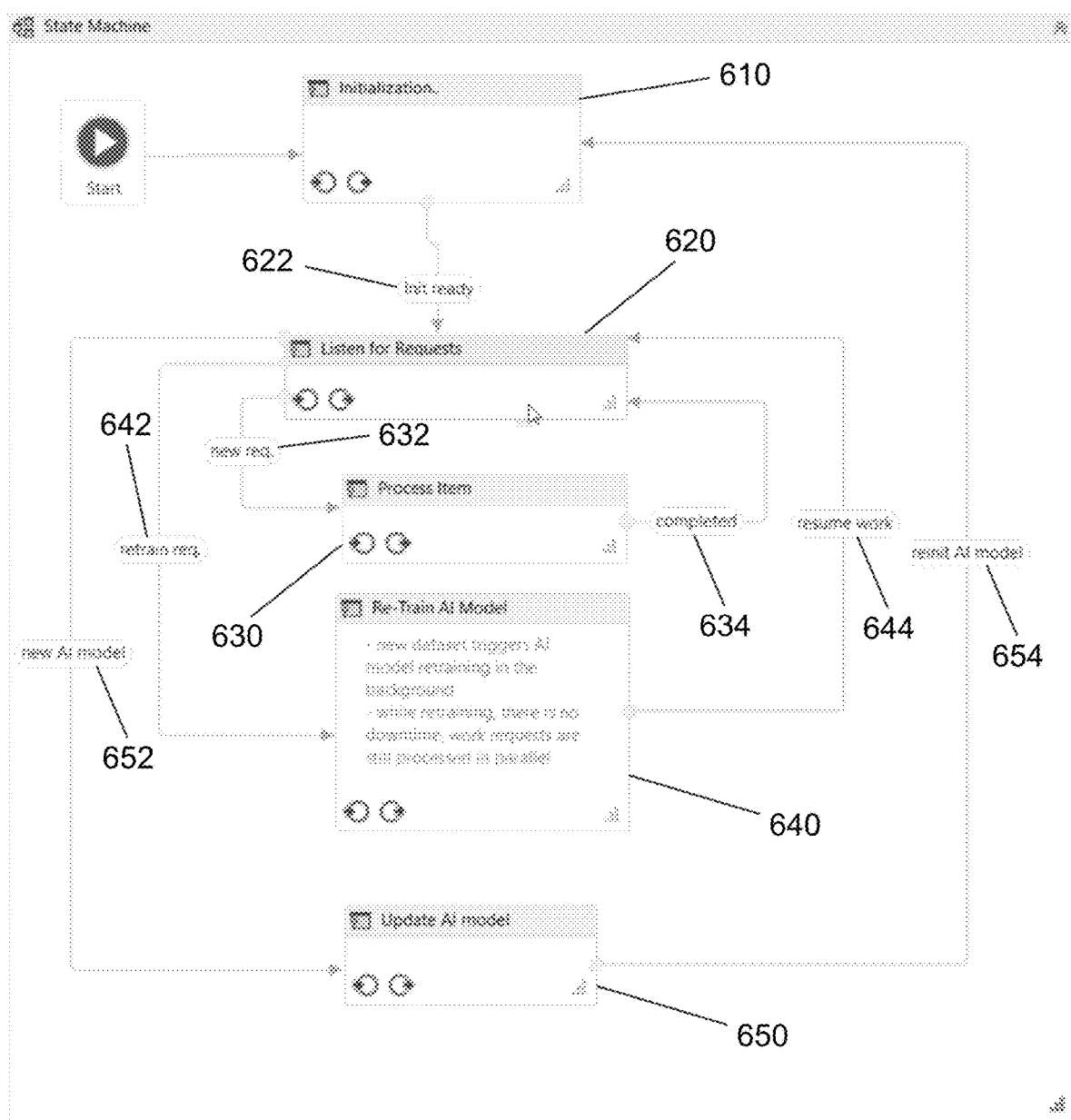
FIG. 6 is a screenshot of a flow diagram of a finite state machine (FSM) configured to dynamically update, or retrain and update, an AI/ML model at runtime, according to an embodiment of the present invention.

By way of nonlimiting example, consider an RPA workflow running as a service that monitors the sentiment of comments received from customers where the workflow is implemented as an FSM. The workflow may monitor a folder for new files that include the customer comments and indicate whether the sentiment in the comments is positive or negative. FIG. 6 is a screenshot of a flow diagram of an FSM 600 configured to dynamically update, or retrain and update, an AI/ML model at runtime, according to an embodiment of the present invention. FSM 600 is shown in UiPath Studio™.

Figure 7A:
FIG. 7A illustrates screenshots of an initialization state of the FSM of FIG. 6, according to an embodiment of the present invention.
Figure 7B:
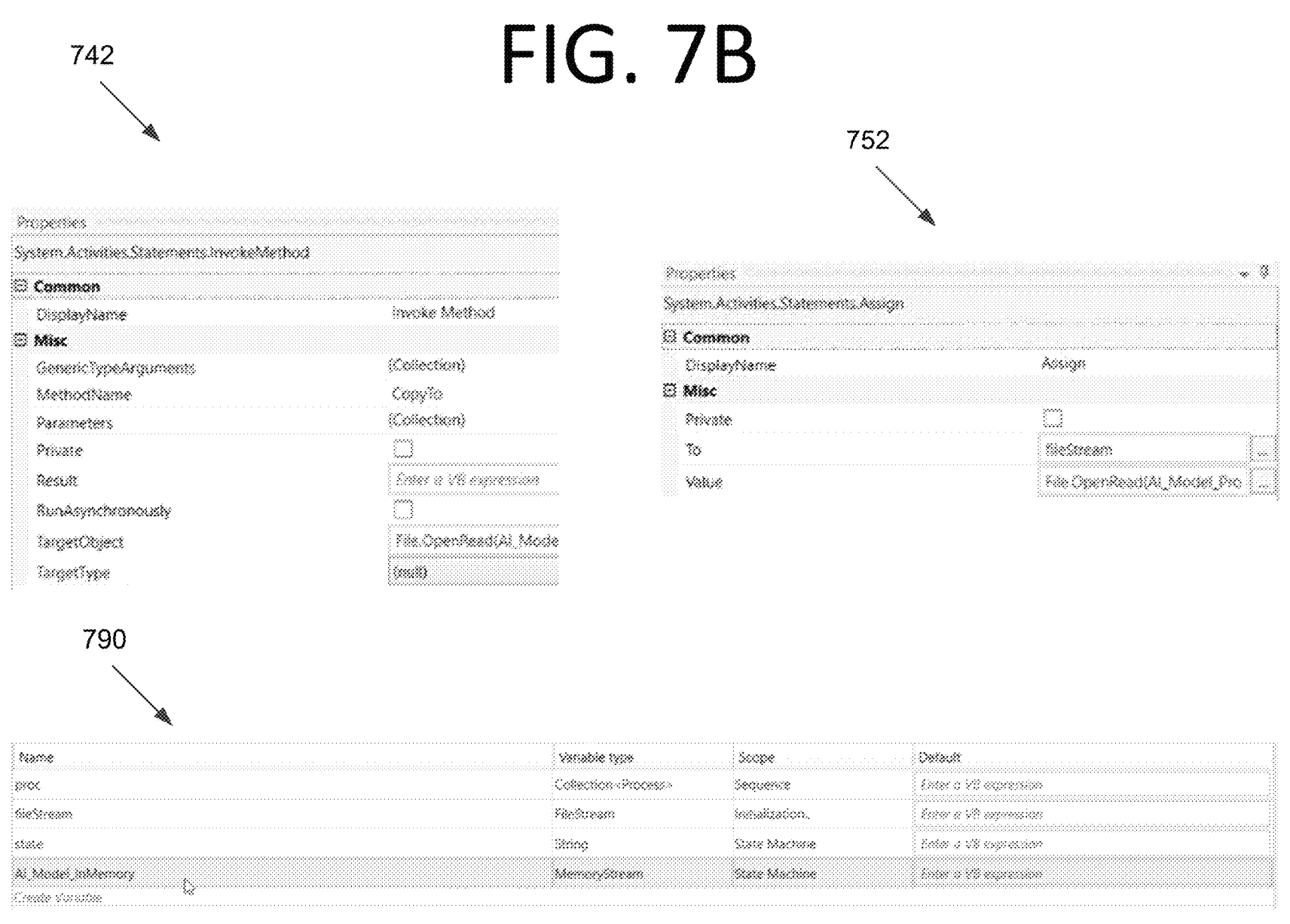

An initialization state 610 loads the AI/ML model from an external file and keeps it in memory in a variable that is accessible to the FSM when the associated AI/ML activity calls the AI/ML model. Further details of the sequence of initialization state 610 and the transition to a listening state 620 are shown in FIGS. 7A and 7B. The state of initialization state 610 is assigned to "init" at 710. Initialization state 610 in this embodiment is a region in the logic of FSM 600 where the AI/ML model, variables, and data are loaded/initialized/instantiated. Text is then output at 720 informing the user that the AI/ML model is being loaded. A variable AI_Model_InMemo is created as a new memory stream at 730. This variable will store the AI/ML model in RAM for use by FSM 600. However, per the above, the AI/ML model may be loaded and/or called from any storage location(s) without deviating from the scope of the invention.

A method is then invoked at 740 that loads the AI/ML model from the local disk and copies it into RAM. See also associated properties 742 of FIG. 7B. A fileStream is assigned to the AI/ML model at 750 and the fileStream performs the copy operation at 760. See also associated properties 752 of FIG. 7B. Variables 790 of initialization state 610 are shown in FIG. 7B.

The fileStream variable holds the data representing the AI/ML model that was loaded from the data store. In the case of a local disk, from this variable, the activity loads the AI/ML model when the activity is instantiated (at the activity object instantiation/creation, in the initialization section of the code, the AI/ML model is loaded from the external variable and assigned to an internal variable that is actually used for processing the input, which is the text parameter in this case).

After the AI/ML model is copied into RAM, the fileStream is disposed of at 770 and FSM 600 is assigned a "listen" state at 780. This may include instantiating based on a trigger in some embodiments (e.g., an HTTP endpoint). This transitions FSM 600 via init ready transition 622 to listening state 620.

Figure 8:
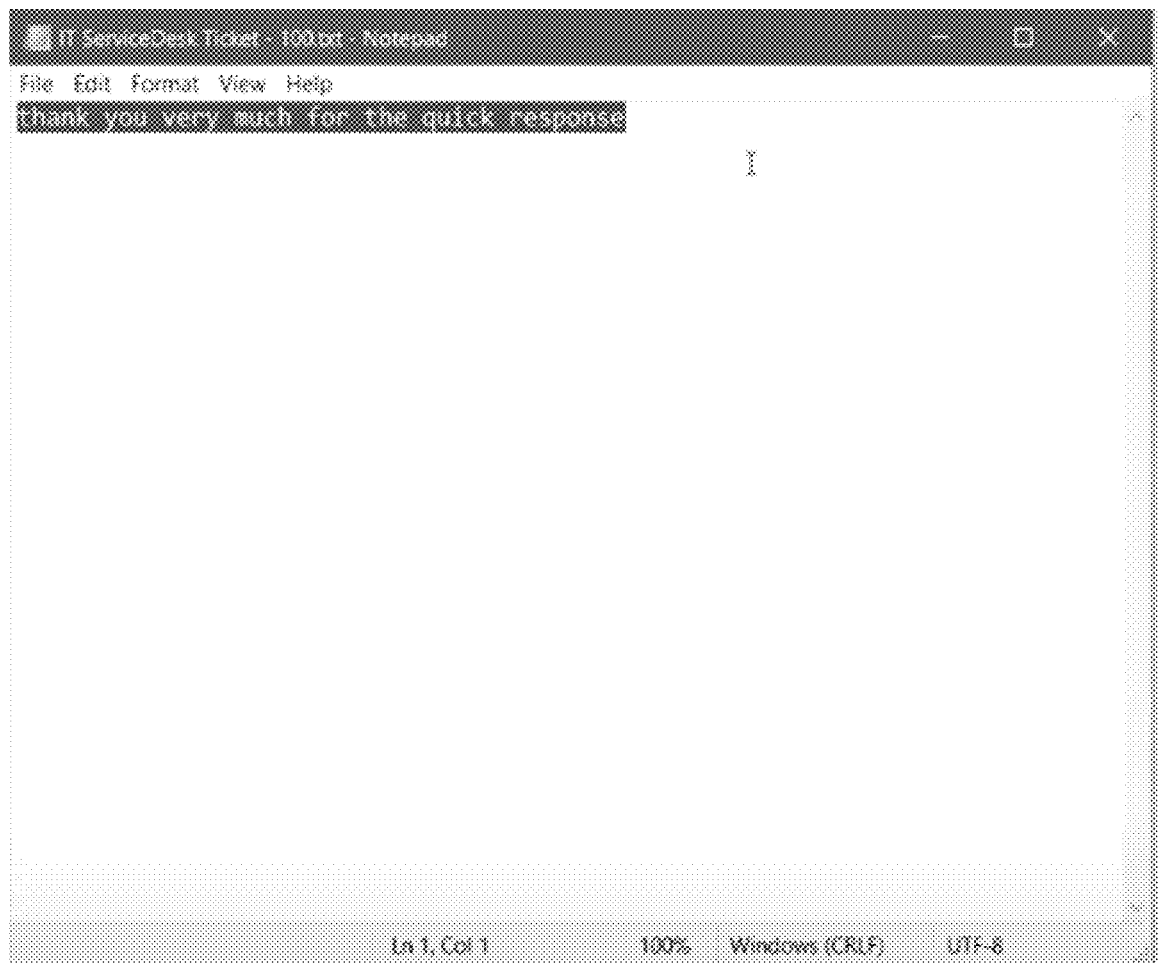
FIG. 8 is a screenshot illustrating a text file including customer feedback, according to an embodiment of the present invention.

In listening state 620, FRM 600 listens for requests (e.g., from email, from a service, from a chatbot, periodically checking for existence of files in a folder, etc.). In the example of FIG. 6, listening state 620 listens for requests to process information technology (IT) service ticket text files stored in a folder. See IT ServiceDesk Ticket 800 of FIG. 8. The text in FIG. 8 is the feedback from a customer responsive to service performed by the IT service desk that the AI/ML model will analyze for sentiment.

Figure 9:
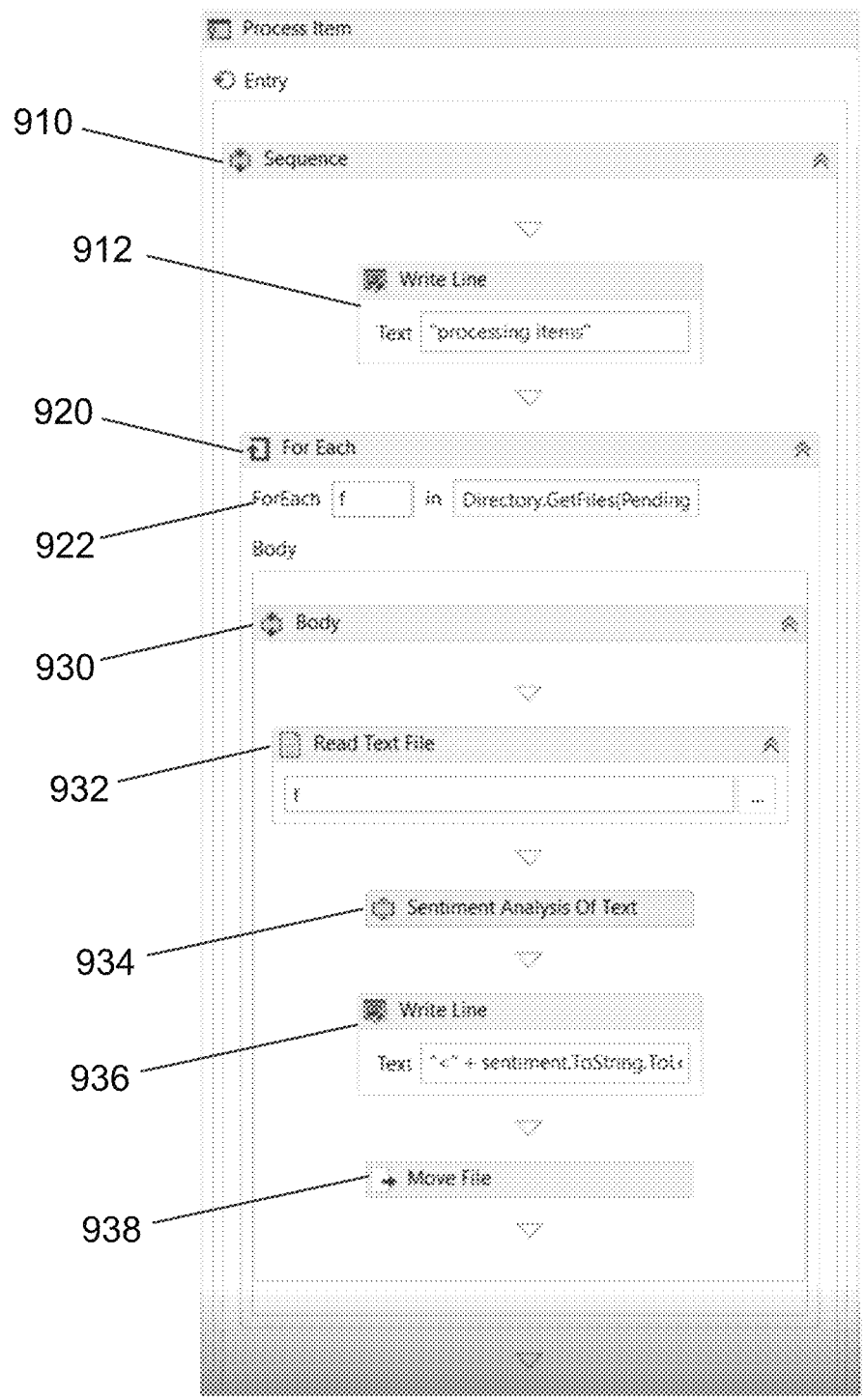
FIG. 9 is a screenshot illustrating an RPA workflow sequence of an item processing state of the FSM of FIG. 6, according to an embodiment of the present invention.
Figure 10:
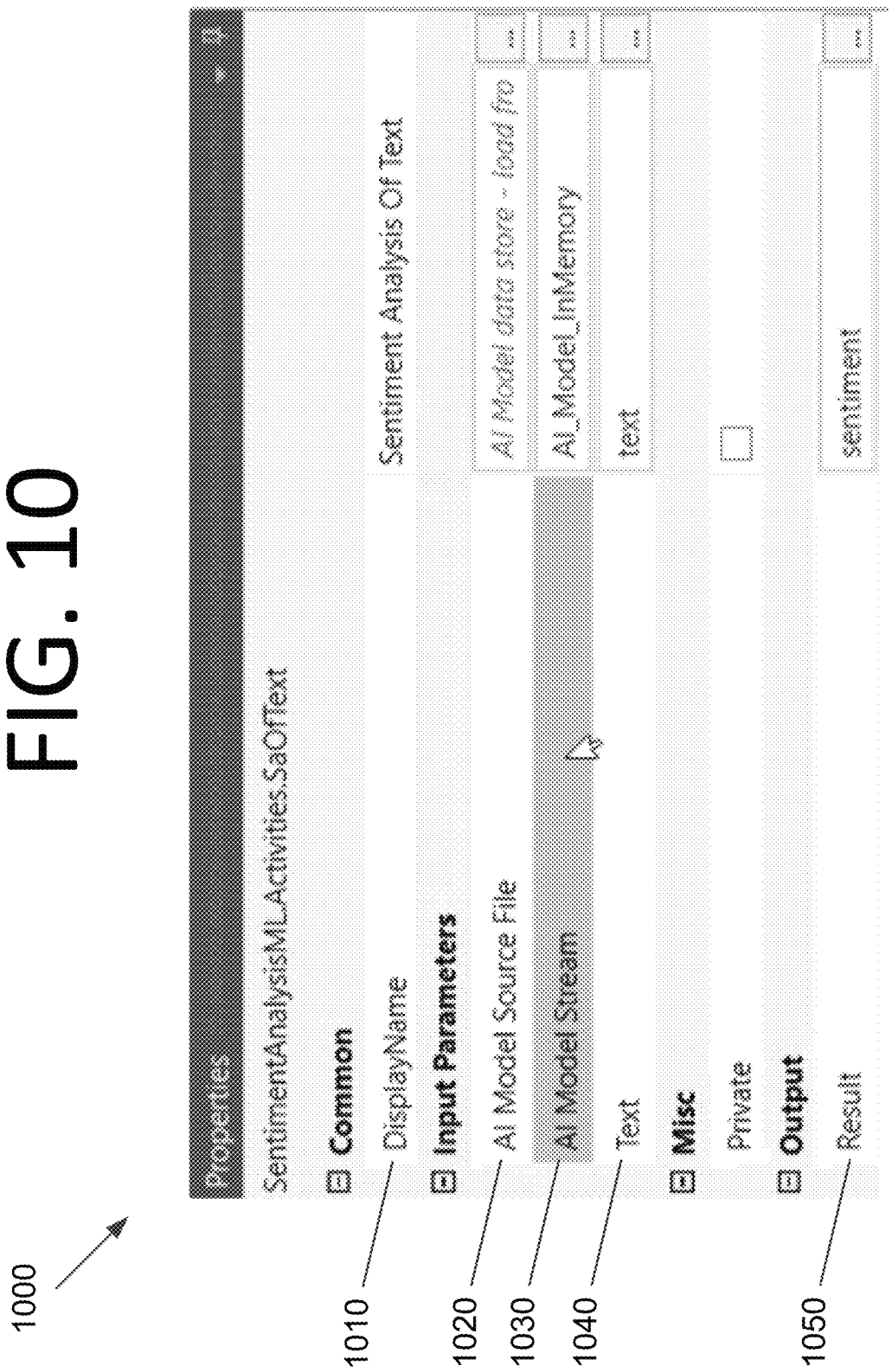
FIG. 10 is a screenshot illustrating properties of an AI/ML model called by the RPA workflow sequence of FIG. 9, according to an embodiment of the present invention.

When a new processing request 632 is received, FSM 600 transitions to an item processing state at 630. A sequence 910 of item processing state 630 is shown in FIG. 9. Sequence 910 includes a write line activity 912 that informs the user that the robot is currently processing items. A "for each" activity 920 enables the robot to step through arrays, lists, data tables or other types of collections such that the robot can iterate through the data and process each piece of information individually. In this example, a condition 922 of "for each" activity 920 is for each file in a selected folder.

A body 930 of "for each" activity 920 includes other nested activities. A read text file activity 932 reads the text of the current file that "for each" activity 920 is iterating through in the folder. This text is included as an input to sentiment analysis AI/ML model activity 934. A write line activity 936 writes the output from sentiment analysis AI/ML model activity 934 for the user to view, and a move file activity 938 moves the current file that "for each" activity 920 has completed analyzing into a different folder.

Properties 1000 of the AI/ML model called by sentiment analysis AI/ML model activity 934 are shown in FIG. 1000. More specifically, a display name 1010, whether the AI/ML model is from a source file 1020 or a stream 1030, a setting 1040 indicating that the content to be analyzed is text, and a result 1050 to be output are provided. Properties 1000 may be customized or changed by the user depending on the requirements of the implementation.

When item processing state 630 is completed at 634, FSM 600 returns to listening state 620. FSM 600 continues processing requests in listening state 620 and item processing state 630 until a retraining request 642 or a new AI/ML model notification 652 is received. When a retraining request 642 is received (e.g., when retraining is requested by a user or a software application, when a new dataset for retraining is received, after a certain amount of data for retraining is received, after a certain amount of time has elapsed since initial training or the last retraining, etc.), FSM 600 causes the AI/ML model to be retrained by entering a retraining initialization state 640. This may be done locally on the computing system executing FSM 600, performed by other computing system(s) external to the computing system running FSM 600, or a combination thereof. If the computing system running FSM 600 is a personal computer and the AI/ML model is complex, for example, it may be beneficial to retrain the AI/ML model on powerful servers that are optimized for training AI/ML models (e.g., employing multiple CPUs and GPUs, performing distributed training using multiple servers where the servers split up the processing tasks, etc.). See, for example, system 1400 of FIG. 14.

Figure 11:
FIG. 11 illustrates screenshots showing progress during retraining and FSM execution status during retraining, according to an embodiment of the present invention.

In this example, retraining of the AI/ML model occurs locally, and a window may be displayed showing the user the progress during retraining. See, for example, retraining window 1100 of FIG. 11, where retraining has been completed with a confidence interval of 95%. Status messages pertaining to the operation of FSM 600 may also be shown. See status messages 1110 of FIG. 11. FSM 600 then resumes work 644 and returns to listening state 620. This allows FSM 600 to continue processing requests while the AI/ML model is being retrained.

Figure 12:
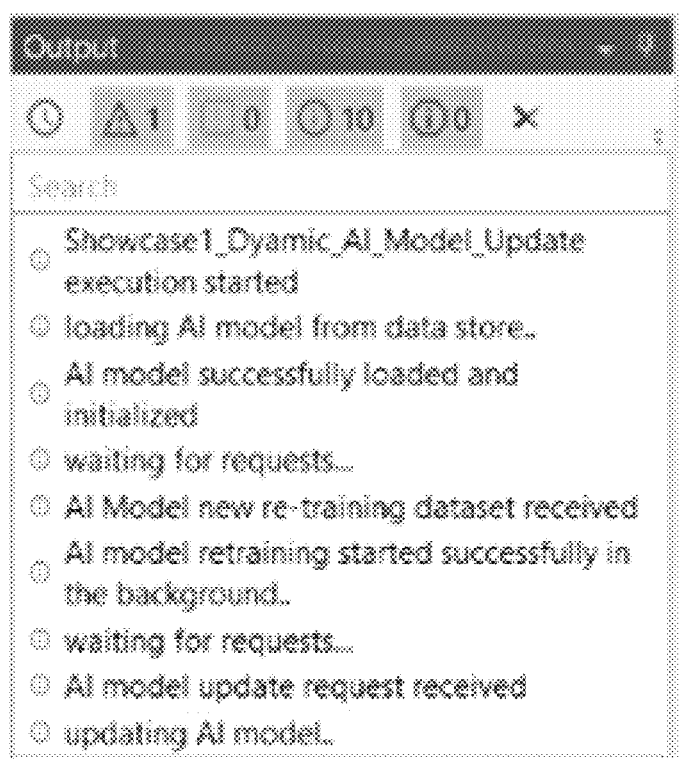
FIG. 12 is a screenshot showing FSM execution status during AI/ML model update, according to an embodiment of the present invention.

When a notification 652 is received that a new AI/ML model or a retrained version of the current AI/ML model is available, FSM 600 enters an update state 650. FSM execution status 1200 during AI/ML model update in FIG. 12. In update state 650, the AI/ML model file is changed to the new AI/ML model file. This essentially replaces the production AI/ML model with the updated AI/ML model. FSM 600 then enters a transition 654 to reinitialize with the new AI/ML model, and FSM 600 returns to initialization state 610, where the new AI/ML model is initialized.

Figure 13:
FIG. 13 is a screenshot illustrating a sequence for updating the AI/ML model, according to an embodiment of the present invention.

FIG. 13 is a screenshot illustrating a sequence 1300 for updating the AI/ML model, according to an embodiment of the present invention. A write line activity 1310 informs the user that the AI/ML model is being updated. A retraining checking activity 1320 checks whether retraining of the AI/ML model is currently occurring. If so, sequence 1300 delays the AI/ML model update until retraining is completed. A file movement activity 1330 moves the new AI/ML model to the location where it will be stored, and a state assignment activity 1340 assigns the state of FSM 600 to initialization state 610. FSM 600 can now be initialized with the updated and/or retrained AI/ML model.

AI/ML Model Update or Retraining and Update Architecture

Figure 14:
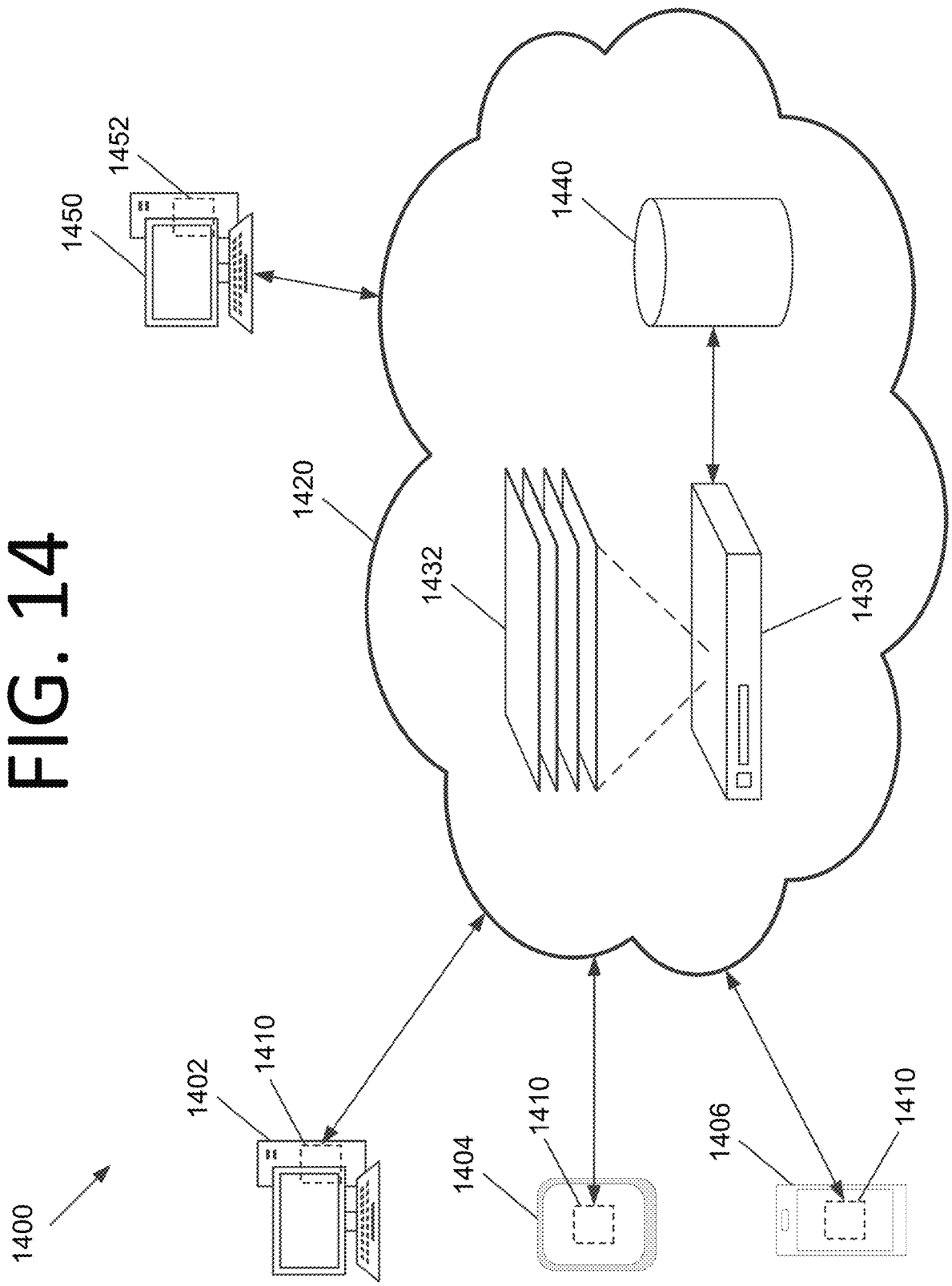
FIG. 14 is an architectural diagram illustrating a system configured to retrain AI/ML models, according to an embodiment of the present invention.

Per the above, in some embodiments, retraining of the AI/ML model may occur remotely from the computing system executing the digital process. FIG. 14 is an architectural diagram illustrating a system 1400 configured to retrain AI/ML models, according to an embodiment of the present invention. System 1400 includes user computing systems, such as desktop computer 1402, tablet 1404, and smart phone 1406. However, any desired computing system may be used without deviating from the scope of invention including, but not limited to, smart watches, laptop computers, Internet-of-Things (IoT) devices, vehicle computing systems, etc.

Each computing system 1402, 1404, 1406 has a digital process 1410 running thereon that calls and/or executes an AI/ML model. Digital processes 1410 may be robots generated via an RPA designer application, be part of an operating system, be a downloadable application for a personal computer (PC) or smart phone, or be any other software and/or hardware without deviating from the scope of the invention. Indeed, in some embodiments, the logic of one or more of digital processes 1410 is implemented partially or completely via physical, hardware.

Digital processes 1410 send AI/ML model update requests, or retraining and update requests, via a network 1420 (e.g., a local area network (LAN), a mobile communications network, a satellite communications network, the Internet, any combination thereof, etc.) to a server 1430. In some embodiments, server 1430 may run a conductor application and the data may be sent periodically as part of the heartbeat message. In certain embodiments, the requests may be sent to server 1430 once a predetermined amount of retraining data has been collected, after a predetermined time period has elapsed, or both. Server 1430 stores AI/ML models of various versions in a database 1440.

When instructed by a human user (e.g., an RPA engineer or a data scientist), when a predetermined amount of retraining data has been collected, when a predetermined amount of time has passed since the last retraining, when a retraining request is received, etc., server 1430 runs the retraining data through multiple AI layers 1432. AI layers 1432 process the data and generate a retrained version of the AI/ML model. AI layers 1432 may perform statistical modeling (e.g., hidden Markov models (HMMs)) and utilize deep learning techniques (e.g., long short term memory (LSTM) deep learning, encoding of previous hidden states, etc.).

In certain embodiments, a data scientist may initiate and/or monitor retraining of the AI/ML model. For instance, the data scientist may supplement the retraining dataset with additional data, retrain the AI/ML model again using different or supplemented training data if the retrained AI/ML model fails to achieve a desired confidence interval, etc. The data scientist may generate an update notification when the AI/ML model is ready and approved and send it to user computing systems 1402, 1404, 1406. Alternatively, server 1430 may generate the notification.

In some embodiments, multiple AI layers 1432 may be used. Each AI layer 1432 is an algorithm (or model) that runs on the retraining data, and the AI/ML models themselves may be deep learning neural networks (DLNNs) of trained artificial "neurons" that are trained in training data. Layers may be run in series or in parallel.

AI layers 1432 may include, but are not limited to, a sequence extraction layer, a clustering detection layer, a visual component detection layer, a text recognition layer (e.g., OCR), an audio-to-text translation layer, multiple instances of one or more types of layers, or any combination thereof. Any desired number and type(s) of layers may be used without deviating from the scope of the invention. Using multiple layers may allow the system to develop a global picture of what is happening in a screen or process. For example, one AI layer could perform OCR, another could detect buttons, etc. Patterns may be determined individually by an AI layer or collectively by multiple AI layers.

AI/ML Model Update or Retraining and Update Processes

Figure 15:
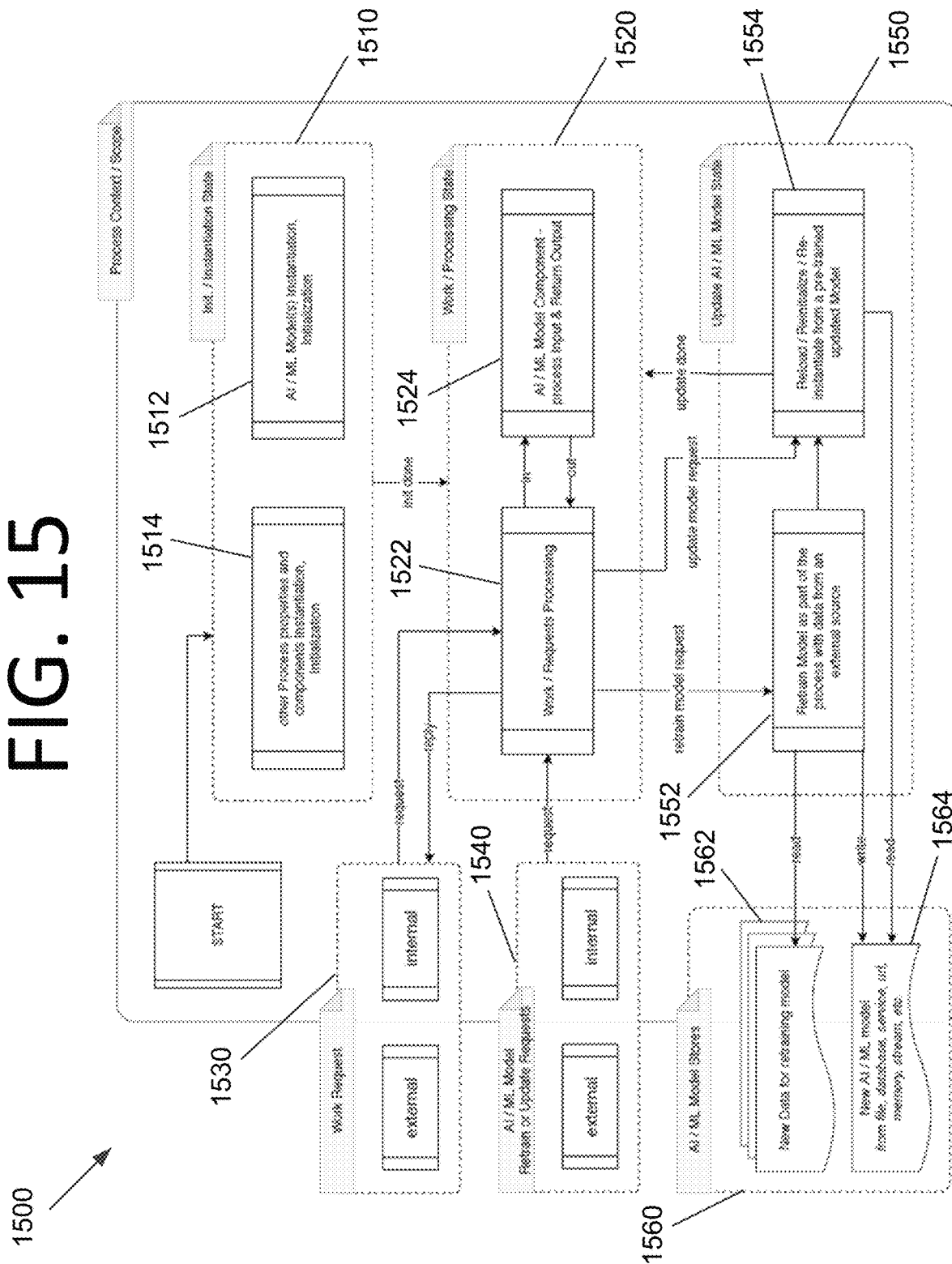
FIG. 15 is an architectural diagram illustrating a digital process for AI/ML model dynamic retraining and update at runtime, according to an embodiment of the present invention.

FIG. 15 is an architectural diagram illustrating a digital process 1500 for AI/ML model dynamic retraining and update at runtime, according to an embodiment of the present invention. In the depicted embodiment, digital process 1500 is an FSM. However, the concepts herein may be embodied in any suitable digital process without deviating from the scope of the invention. Digital process 1500 begins with an initialization/instantiation state 1510, which makes the AI/ML model callable by the process. Initiation/instantiation state 1510 includes an AI/ML model instantiation/initialization component 1512, as well as a component 1514 instantiation or initialization of other properties and components of digital process 1500.

After initialization is complete, digital process 1500 transitions to a work/processing state 1520. In work/processing state 1520, digital process 1500 listens for work requests 1530, as well as AI/ML model retraining or update requests 1540, and performs request processing via work/request processing component 1522. Work requests 1530 and AI/ML model retraining or update requests 1540 may be internal (i.e., from the computing system executing digital process 1500) or external (i.e., from another computing system).

When a work request 1530 is received, information for the AI/ML model is provided as an input to AI/ML model component 1524, which processes the input information and provides an output to work/request processing component 1522. Work/request processing component 1522 then provides a reply to the requestor associated with work request 1530 (e.g., another software application) with information associated with the results of the execution of AI/ML model component 1524.

When work/request processing component 1522 receives an AI/ML model retraining request 1540, this is sent to AI/ML model retraining component 1552 of update AI/ML model state 1550. New data 1662 for retraining the AI/ML model is read from AI/ML model stores 1560 (e.g., a database) and the retrained (new) AI/ML model 1564 is written to AI/ML model stores 1560. Reloading/reinitialization/re-instantiation component 1554 then reloads/reinitializes/re-instantiates digital process 1500 with retrained (new) AI/ML model 1564, and digital process 1500 then returns to work/processing state 1520 using retrained (new) AI/ML model 1564.

Figure 16:
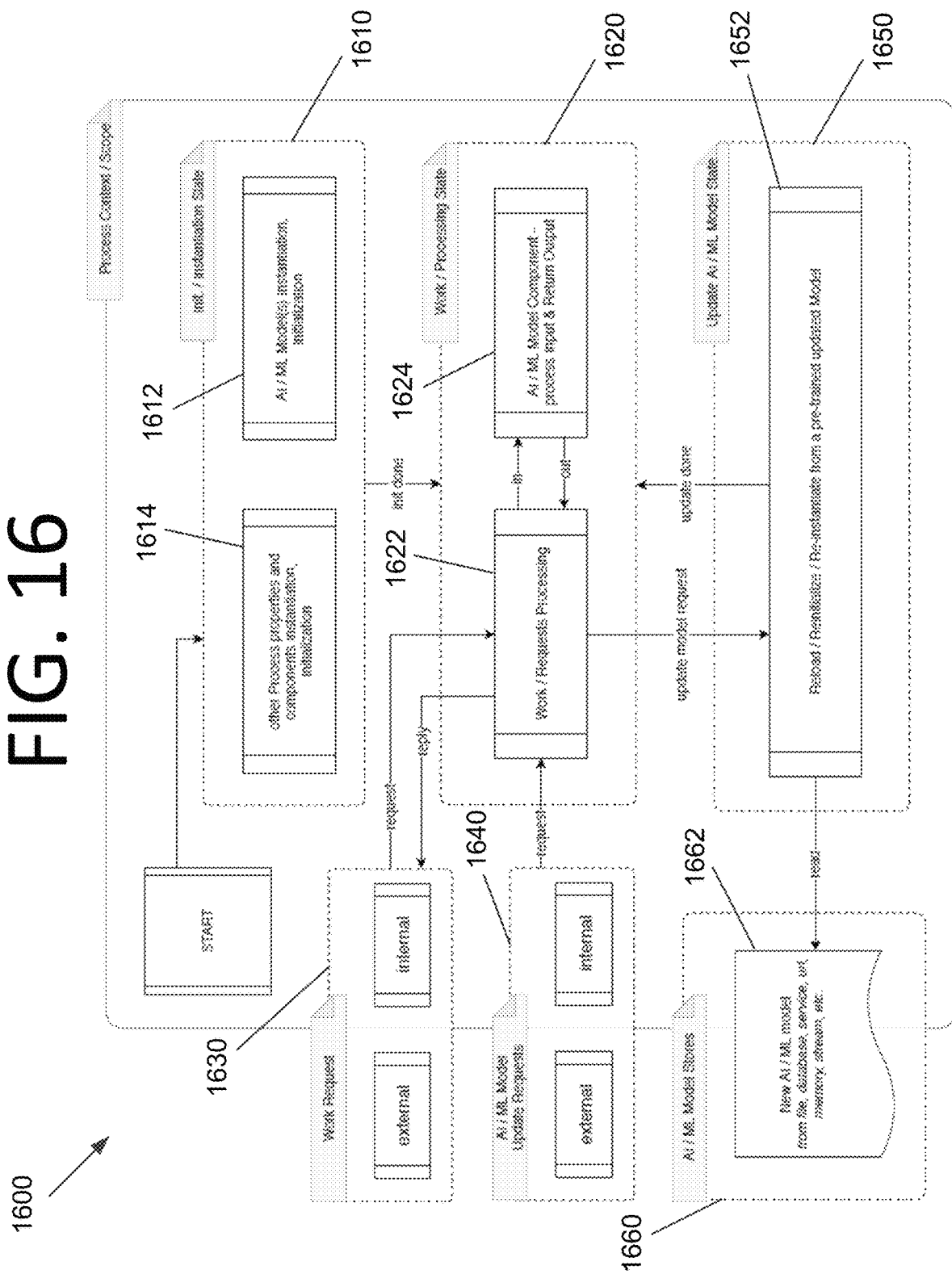
FIG. 16 is an architectural diagram illustrating a digital process for AI/ML model dynamic update at runtime, according to an embodiment of the present invention.

FIG. 16 is an architectural diagram illustrating a digital process 1600 for AI/ML model dynamic update at runtime, according to an embodiment of the present invention. In the depicted embodiment, digital process 1600 is an FSM. However, the concepts herein may be embodied in any suitable digital process without deviating from the scope of the invention.

As with digital process 1500, digital process 1600 includes an initialization/instantiation 1610 with components 1612, 1614 for instantiation or initialization of one or more AI/ML models and for other properties and components of digital process 1600, respectively, a work/processing state 1520 with a work/request processing component 1622 and an AI/ML model component 1524, and work requests 1630. However, in this embodiment, digital process 1600 is not involved in retraining of the AI/ML model. Thus, digital process 1600 receives AI/ML model update requests 1640.

When an AI/ML model update request 1640 is received by work/request processing component 1622, AI/ML model update request 1640 is sent to reloading/reinitialization/re-instantiation component 1652 of update AI/ML model state 1650, when then reloads/reinitializes/re-instantiates digital process 1500 with a new (or otherwise updated) AI/ML model 1662 from AI/ML model stores 1660. Digital process 1600 then returns to work/processing state 1620 using new AI/ML model 1662.

Figure 17:
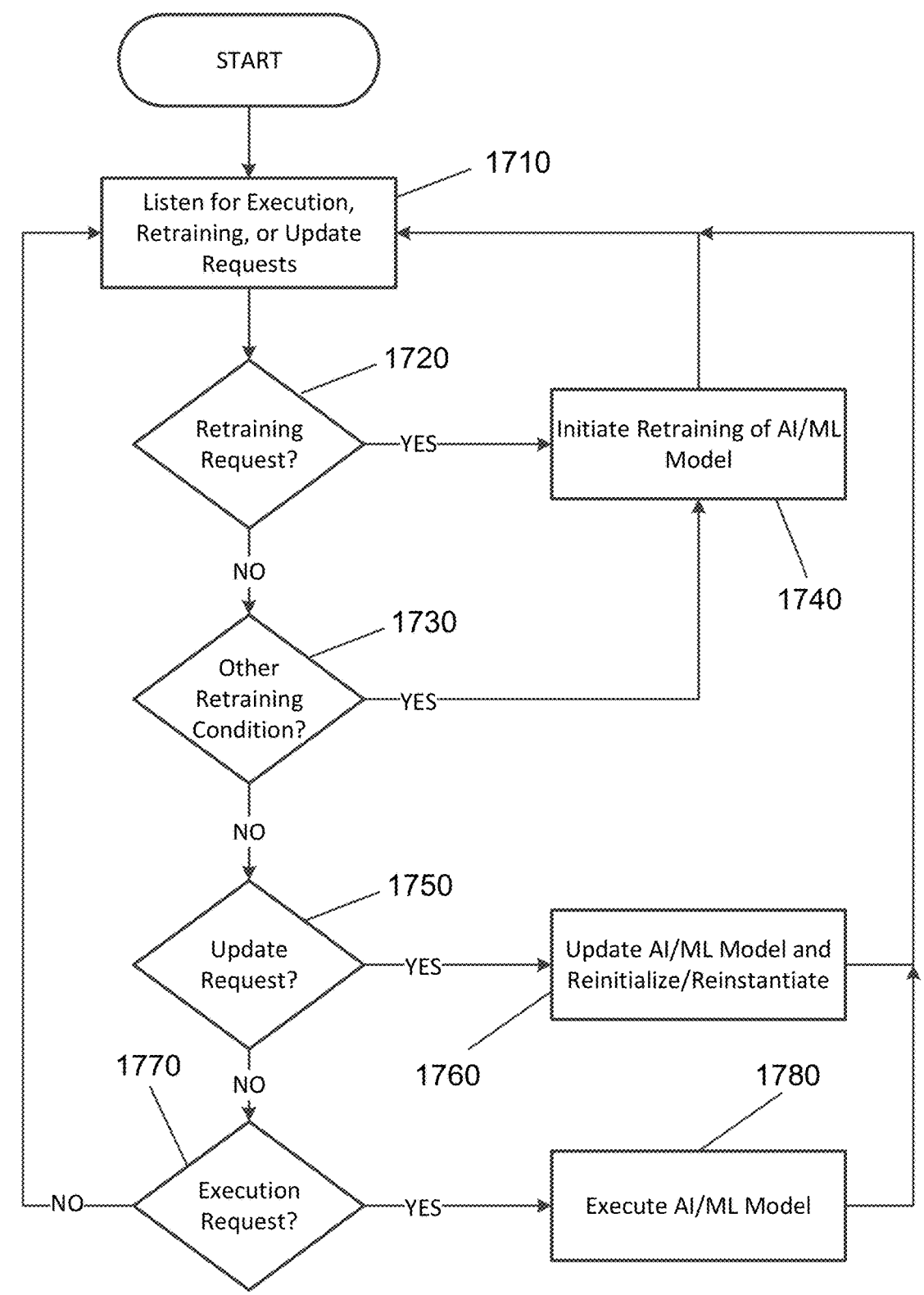
FIG. 17 is a flowchart illustrating a process for AI/ML model dynamic update, or dynamic retraining and update, in a digital process during runtime, according to an embodiment of the present invention.

FIG. 17 is a flowchart illustrating a process 1700 for AI/ML model dynamic update, or dynamic retraining and update, in a digital process during runtime, according to an embodiment of the present invention. The process begins with listening for a request to execution request, a retraining request, or an update request for an AI/ML model at 1710. If a retraining request is received at 1720 or another retraining condition is met at 1730, retraining of the AI/ML model is initiated at 1740. The digital process implementing process 1700 may continue execution with the current version of the AI/ML model while retraining is occurring.

In some embodiments, the digital process is an RPA workflow, a BPM flowchart, a sequential flow, or an FSM. In certain embodiments, an FSM may be part of an RPA workflow. In certain embodiments, the AI/ML model is called by an activity of an RPA workflow. In some embodiments, the AI/ML model is embedded directly in the activity of the RPA workflow.

The other retraining conditions may provide a mechanism for automatic retraining of the AI/ML model. These conditions may include a predetermined amount of training data being received, a predetermined amount of time passing since the last retraining, a combination thereof, etc. Any retraining conditions for automatic retraining may be used without deviating from the scope of the invention.

When an update request is received at 1750, the AI/ML model is updated and the digital process is reinitialized or re-instantiated at 1760. In some embodiments, this may involve comparing performance of the retrained AI/ML model to a performance threshold, against performance of a previous version of the AI/ML model, or both, and only updating the AI/ML model if the new version meets performance criteria. In certain embodiments, if these criteria are not met, no update request is sent.

If a request to execute the AI/ML model is received at 1770, the AI/ML model is executed at 1780. If none of steps 1720, 1730, 1750, or 1770 is satisfied, the process returns to listening for a retraining request or an update request for the AI/ML model at 1710. Process 1700 may continue execution until a digital process implementing process 1700 is stopped.

The process steps performed in FIGS. 15-17 may be performed by a computer program, encoding instructions for the processor(s) to perform at least part of the process(es) described in FIGS. 15-17, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 15-17, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    listening for an update request for an artificial intelligence (AI)/machine learning (ML) model, by a digital process executing on a computing system and comprising an automation executing logic of a robotic process automation (RPA) workflow comprising an activity that calls the AI/ML model via an expression; and
    responsive to receiving the update request to update the AI/ML model, reinitializing or re-instantiating the digital process to call an updated version of the AI/ML model at runtime of the digital process by modifying the expression of the activity that calls the AI/ML model, by the digital process executing on the computing system, wherein
    the reinitializing of the digital process comprises resetting a state of one or more components of the digital process, and
    the re-instantiating of the digital process comprises creating the AI/ML model inside the digital process.

2. The computer-implemented method of claim 1, further comprising:
    listening for a retraining request for the AI/ML model, by the digital process executing on the computing system; and
    responsive to receiving the retraining request to retrain the AI/ML model, initiating retraining of the AI/ML model during runtime of the digital process, by the digital process executing on the computing system.

3. The computer-implemented method of claim 2, wherein the retraining of the AI/ML model occurs on one or more other computing systems different than the computing system executing the digital process.

4. The computer-implemented method of claim 2, further comprising:
    using a current version of the AI/ML model during the retraining, by the digital process running on the computing system, until the update request is received.

5. The computer-implemented method of claim 2, further comprising:
    comparing performance of the retrained AI/ML model to a performance threshold, against performance of a previous version of the AI/ML model, or both, by the digital process executing on the computing system; and
    updating the AI/ML model responsive to the retrained AI/ML model exceeding the performance threshold, the performance of the previous version of the AI/ML model, or both, by the digital process executing on the computing system.

6. The computer-implemented method of claim 1, wherein the digital process comprises a business process management (BPM) flowchart, a sequential flow, or a finite state machine (FSM).

7. The computer-implemented method of claim 1, further comprising:
running the digital process initially in an initialization/instantiation state that makes the AI/ML model callable by the digital process prior to listening for the update request, by the digital process executing on the computing system.

8. The computer-implemented method of claim 1, wherein the AI/ML model is embedded directly in the activity of the RPA workflow.

9. The computer-implemented method of claim 1, wherein the digital process comprises an initialization state that loads the AI/ML model from storage or makes the AI/ML model callable by the digital process.

10. The computer-implemented method of claim 1, further comprising:
receiving a request to run the AI/ML model, by the digital process running on the computing system;
executing the AI/ML model, or causing the AI/ML model to be executed, by the digital process running on the computing system; and
returning results of the execution of the AI/ML model, by the digital process running on the computing system.

11. A non-transitory computer-readable medium storing a computer program comprising an automation executing logic of a robotic process automation (RPA) workflow comprising an activity that calls an artificial intelligence (AI)/machine learning (ML) model via an expression, the computer program configured to cause at least one processor to:
listen for a retraining request or an update request for the AI/ML model;
responsive to receiving the retraining request to retrain the AI/ML model, initiate retraining of the AI/ML model at runtime; and
responsive to receiving the update request to update the AI/ML model, reinitialize or re-instantiate the digital process at runtime of the digital process by modifying the expression of the activity that calls the AI/ML model to call an updated version of the AI/ML model, wherein
the reinitializing of the digital process comprises resetting a state of one or more components of the digital process, and
the re-instantiating of the digital process comprises creating the AI/ML model inside the digital process.

12. The computer program of claim 11, wherein the computer program is further configured to cause the at least one processor to:
use a current version of the AI/ML model during the retraining until the update request is received.

13. The computer program of claim 11, wherein the computer program is further configured to cause the at least one processor to:
compare performance of the retrained AI/ML model to a performance threshold, against performance of a previous version of the AI/ML model, or both; and
update the AI/ML model responsive to the retrained AI/ML model exceeding the performance threshold, the performance of the previous version of the AI/ML model, or both.

14. The computer program of claim 11, wherein the computer program is further configured to cause the at least one processor to:
automatically initiate retraining of the AI/ML model after a predetermined amount of training data is received, after a predetermined amount of time has elapsed since a last retraining, or both.

15. The computer program of claim 11, wherein the computer program is further configured to cause the at least one processor to:
receive a request to run the AI/ML model;
execute the AI/ML model or cause the AI/ML model to be executed; and
return results of the execution of the AI/ML model.

16. A computing system, comprising:
memory storing computer program instructions comprising a digital process, the digital process comprising and automation executing logic of a robotic process automation (RPA) workflow comprising an activity that calls an artificial intelligence (AI)/machine learning (ML) model via an expression; and
at least one processor configured to execute the computer program instructions, the computer program instructions configured to cause the at least one processor to:
listen for a retraining request for the AI/ML model,
responsive to receiving the retraining request to retrain the AI/ML model, initiate retraining of the AI/ML model,
listen for an update request for the AI/ML model, and
responsive to receiving the update request to update the AI/ML model, reinitialize or re-instantiate the digital process by modifying the expression of the activity that calls the AI/ML model to call an updated version of the AI/ML model, wherein
the reinitializing of the digital process comprises resetting a state of one or more components of the digital process to an initial value, and
the re-instantiating of the digital process comprises creating the AI/ML model inside the digital process at runtime.

17. The computing system of claim 16, wherein the computer program instructions are further configured to cause the at least one processor to:
use a current version of the AI/ML model during the retraining until the update request is received.

18. The computing system of claim 16, wherein the computer program instructions are further configured to cause the at least one processor to:
compare performance of the retrained AI/ML model to a performance threshold, against performance of a previous version of the AI/ML model, or both; and
update the AI/ML model responsive to the retrained AI/ML model exceeding the performance threshold, the performance of the previous version of the AI/ML model, or both.

19. The computing system of claim 16, wherein the computer program instructions are further configured to cause the at least one processor to:
automatically initiate retraining of the AI/ML model after a predetermined amount of training data is received, after a predetermined amount of time has elapsed since a last retraining, or both.

20. The computing system of claim 16, wherein the computer program instructions are further configured to cause the at least one processor to:
receive a request to run the AI/ML model;

execute the AI/ML model or cause the AI/ML model to be executed; and return results of the execution of the AI/ML model.

\* \* \* \* \*